United States Patent Office  3,507,913
Patented Apr. 21, 1970

3,507,913
METHOD OF MANUFACTURE OF TEREPHTHALIC ACID
Motoo Mato, Ootake-shi, Ariaki Sakurada, Iwakuni-shi, Koichi Okano and Yoshilo Yokota, Ootake-shi, and Shigeto Nakagawa, Kuga-gun, Japan, assignors to Mitsui Petrochemical Industries, Ltd., Tokyo, Japan, a corporation of Japan
No Drawing. Filed Feb. 8, 1967, Ser. No. 614,562
Claims priority, application Japan, Feb. 14, 1966, 41/8,320; Mar. 8, 1966, 41/13,764
Int. Cl. C07c 63/02
U.S. Cl. 260—524         5 Claims

ABSTRACT OF THE DISCLOSURE

Method of producing a fiber-grade terephthalic acid of high purity suitable for use as a starting material of polyesters by the so-called direct polymerization method, characterized in that the reaction is carried out in a specific combination of a reaction zone and a precipitating zone under specific conditions.

---

This invention concerns a method of the manufacture of terephthalic acid useful as the starting material for polyesters. Particularly, it relates to a method of manufacturing a fiber-grade terephthalic acid of high purity suitable for the preparation of polyesters for fibers and films which require high transparency and/or whiteness, by the so-called direct polymerization method by which terephthalic acid is directly reacted with a glycol without going through dialkyl terephthalate.

More particularly, this invention relates to a method of the manufacture of fiber-grade terephthalic acid of high purity by oxidizing para-xylene by contact with molecular oxygen or molecular oxygen-containing gas under the high temperature and elevated pressure conditions in acetic acid as a solvent in the presence of a catalyst soluble in the said solvent, characterized in that the oxidation reaction is carried out while continuously introducing into a reaction zone where complete mixing is possible, a stream of a mixture containing para-xylene, acetic acid and the catalyst and molecular oxygen gas or molecular oxygen-containing gas in an amount such that the oxygen present in the waste gas exhausted from the said reaction zone may be 3% or more by volume of the said exhaust gas; meanwhile the reaction product liquor is substantially continuously withdrawn from the said reaction zone; in the optional zone after the reaction zone and before a zone including a crystal precipitating zone, acetic acid of a temperature lower than the temperature of the said reaction product is added in an amount 1/10–5 times, preferably 1/2–4 times, the volume of the said reaction product liquor while the temperature of the reaction product liquor is not lower than 180° C. and a solid terephthalic acid precipitated in the said reaction product liquor does not exceed 20% by weight of the reaction product liquor, to thereby precipitate the crystals substantially, and that in a crystal precipitating zone, acetic acid in the precipitating system is maintained at a pressure above its vapor pressure at the temperature of the precipitating zone.

It has hitherto been known to produce terephthalic acid by oxidizing para-xylene by contact with molecular oxygen or molecular oxygen-containing gas under high temperature and elevated pressure conditions in acetic acid as a solvent in the presence of a catalyst soluble in the said solvent. It is also known that polyesters manufactured from the so obtained terephthalic acid by the said direct polymerization method do not meet the need of transparency and/or whiteness for the objects of fiber or film making. To avoid this difficulty, there is employed a method of obtaining polyesters by first converting such a terephthalic acid into its dialkyl derivative, purifying it and then polycondensing it with a glycol.

It is thus clear that the direct polymerization method is of advantage commercially in view of the decrease in the number of steps involved. To solve the problem of how to produce a high purity terephthalic acid, many proposals have been made with respect to the oxidation reaction conditions, the method of crystallizing terephthalic acid from a liquor of the reaction product, the method of purifying the obtained terephthalic acid, and so on.

To obtain terephthalic acid suitable for use in the direct polymerization method, it is considered necessary to remove 4-carboxybenzaldehyde and other impurities sufficiently. But there are too many unknown points as regards the influence of the impurities upon the transparency and/or whiteness of the obtained polyesters in the practice of direct polymerization method. For instance, it is difficult to conclude only on the basis of the optical density of a starting terephthalic acid whether the terephthalic acid has a purity satisfactory for the manufacture of fiber- or film-forming polyesters. If, for example, terephthalic acids having the same optical density but obtained from different batches are used, the same results are not necessarily obtained. It is therefore still one of the problems of the art how to obtain terephthalic acid whose optical density is good enough to indicate high jurity, and which, when made into polyesters by direct polymerization method, exhibits satisfactory transparency and/or whiteness. Moreover, the solution of this problem becomes more difficult because, as already mentioned, it is not necessarily clear by what impurity the dissatisfaction in transparency and whiteness of polyesters obtained by direct polymerization method is caused.

Under these circumstances, the indication of quality by the term "fiber grade" has been proposed. This means such a purity of terephthalic acid as will satisfy the transparency and/or whiteness of polyesters obtained therefrom by direct polymerization method. Although this is a functional expression, such a purity cannot at present be expressed otherwise. This term does not indicate a quantitative degree of purity, but is suitable to indicate whether the purity of a certain terephthalic acid is appropriate for the preparation of polyesters by direct polymerization.

It should be understood that the "fiber grade high purity," as used herein, means such a purity of terephthalic acid whose optical density is not greater than 0.04 as can satisfy the above-mentioned functional requirements.

As a result of researches to provide an advantageous method by which to produce terephthalic acid having such purity and being suitable for the manufacture of polyesters by direct polymerization, we have found that the oxidation reaction should be carried out in a reaction zone where a complete mixing is possible; that a multi-stage reaction, for instance, a reaction system by which oxidation is consecutively performed by passing the reactants through a plurality of different reaction zones, should be positively avoided; and that the multi-stage oxidation reaction system which has hitherto been considered suitable for a uniform oxidation reaction and has been actually employed, on the contrary, tends to facilitate the formation of impurities which adversely affect the fiber grade quality.

We have also found that a fiber grade terephthalic acid of high purity can be manufactured constantly by adding acetic acid of a temperature lower than that of the reaction product liquor in an amount of a specific range while the temperature of the reaction product liquor is not lower than 180° C., an amount of a solid terephthalic acid precipitated in the said liquor does not exceed 20% by weight of the said liquor and the reaction product liquor does not come out of a crystal precipitating zone where a substantial precipitation is carried out, carrying out the substantial precipitation during or after addition of the acetic acid, and maintaining the precipitating system at above the vapor pressure of the acetic acid at the temperature of the precipitating zone, during precipitation; that it is extremely difficult to obtain terephthalic acid of the desired quality constantly if terephthalic acid is crystallised by adding acetic acid to the reaction product liquor of a temperature not higher than 180° C. and/or having a precipitated solid content in excess of 20% by weight, or if terephthalic acid, after crystallization from the said reaction product liquor, and filtration, is purified by washing with acetic acid and recrystallization or if it is crystallised while evaporating acetic acid; and therefore that the product of the desired quality can be constantly obtained by the crystallization during the addition of acetic acid which satisfies the said four conditions.

Furthermore, it has been found that a combination of oxidation reaction in the said complete mixing reaction zone with the said precipitating conditions is of importance, and the absence of either of these cannot achieve the objects easily.

The reasons for this, particularly details of the cause of formation and type of impurities detrimental to the fiber grade quality, the time of their formation, and the behaviours of the impurities at the time of crystallization are not known. The formation of impurities detrimental to the fiber grade quality is subtly related to the method of oxidation reaction and there is a considerably close relationship between the crystallization tendency of the impurities and that of terephthalic acid. Some of the impurities affect the fiber grade adversely, but others do not so much affect it. By the mutual influences of very many factors such as the proportion of the formed impurities, the time of formation thereof and the crystallization tendency, there is more formation of disadvantageous impurities and these impurities are crystallized out in the form such that they are included by the terephthalic acid and not in the form of mere adhesion. It is conjectured that a combination of the said many requirements is necessitated in order to avoid the conditions to cause the above-mentioned crystallization.

Accordingly, an object of this invention is to provide an improved method of the manufacture of a fiber grade terephthalic acid of high purity constantly.

Many other objects and advantages of this invention will become clear from the description which follows.

One of the important features of this invention is to carry out the known oxidation step by which oxidation is performed by contacting molecular oxygen or molecular oxygen-containing gas with para-xylene in an acetic acid solvent in the presence of a catalyst, in a reaction zone where complete mixing is possible. It is particularly advantageous that oxygen according to this reaction is fed in an amount such that oxygen present in a waste gas exhausted from the reaction zone may be not less than 3% by volume of the said waste gas.

By the term "reaction zone where complete mixing is possible" used in describing the method of this invention is meant a positive exclusion of such methods as a consecutive multi-stage type oxidation by which reactants are continuously passed through zones where reaction proceeds progressively or a method by which reactants are passed through a reaction zone by the use of the so-called plug flow consecutive reactor while forming the reaction system where oxidation is progressively carried out, in both of which methods the mixing in a reaction zone of the reaction product, fed reactants and intermediate product, that is, the mixing of the reaction product and fed starting materials (the so-called back mixing) is avoided as much as possible.

Heretofore, the non-back mixing type oxidation reaction has been recommended, and particularly, to carry out the reaction so as to avoid the formation of by-products or intermediate products and their intrusion into the intended final product has been regarded as directly relating to the improvement of purity of the final product. The back mixing type reaction has thus been considered to lower the purity of the intended product. As a matter of fact, in the field of the known technique of manufacturing terephthalic acid, methods which are positively excluded by the method of this invention have been recommended and proposed.

It has been found however that a fiber grade terephthalic acid of high purity can be manufactured, in conjunction with a second important feature which will be touched upon later in the pages, by forming a reaction zone where the reaction product, intermediate and starting reactants are coexistent and may be mixed completely under sufficient mixing condition and carrying out a continuous reaction in the so-called back mixing type reaction zone. Such a method is evidently different from the batch method in that reactants are continuously fed into a reaction zone and a stream of the reaction product is continuously withdrawn.

It is quite an unexpected result that a fiber grade terephthalic acid of high purity can be constantly manufactured by an oxidation method which runs counter to the general technical concept and the hitherto-proposed technical concept. This result is more surprising in view of the fact that it has been held previously that the known reaction by which para-xylene is contacted with molecular oxygen or molecular oxygen-containing gas under the high temperature and elevated pressure conditions in an acetic acid solvent in the presence of a catalyst soluble in the said solvent is a consecutive reaction and aldehydes, the intermediates formed by this reaction, undergo side reaction and tend to form other impurities, which intrude into the precipitated crystals of the intended product and prevent the formation of a fiber grade terephthalic acid of high purity.

If commercial feasibility is disregarded, it is conceivable to maintain the concentration of the material to be oxidized in the reaction liquor at a very low level in order to inhibit such side-reaction and manufacture terephthalic acid of high purity. But to maintain the concentration of the material to be oxidized at a low level it is necessary to elevate the solvent ratio extremely. As a result, the volume of the reactor is increased, and the amount of solvent decomposed by oxidation is also on the increase. It is remarkably disadvantageous from the standpoint of operation, equipment and economy, and not practical at all. When at batch-type oxidation is carried out, the concentration of the material to be oxidized is very high at an initial stage of reaction and immediately after the start of reaction, a great quantity of intermediates are present in the reaction system. For this reason, side-reaction takes place, and the purity of the product is remarkably decreased. Thus, in this invention, the batch method should also be positively excluded.

As has been clarified more from the foregoing explanation, the term "reaction zone where complete mixing is possible" which is essential in the method of this invention is meant to exclude such type or reaction as the batch oxidation reaction, multi-stage consecutive oxidation reaction and plug flow type consecutive oxidation reaction, and is also meant to express a reaction zone where a completely miscible, back mixing type reaction system is formed and substantially all of the oxidation reaction is completed there but a continuous feeding of the starting reactants and a continuous withdrawal of the reaction product go with it.

According to the method of this invention, known reaction conditions and means can be appropriately chosen and employed if only the oxidation reaction is carried out in a reaction zone where complete mixing is possible and oxygen is fed in an amount such that oxygen in a waste gas is not less than 3% by volume of the said waste gas.

The reaction can be advantageously carried out at a temperature in the range of 200 to 250° C., preferably 225 to 245° C., and a gage pressure of 28 to 45 kg./cm.$^2$, with an average residence time of 20 to 180 minutes, preferably 40 to 90 minutes. The concentration of p-xylene to be fed into the reaction zone may be not greater than 57% by weight, ordinarily not greater than 17%, but it is preferred to conduct the operation at the concentration of 5 to 17%, for instance. The reaction pressure of 28 kg./cm.$^2$ and higher is preferable as the amount of oxygen coexistent in the acetic acid solvent becomes sufficient. But there is no necessity whatever to adopt excessively high pressure, the pressure in excess of 45 kg./cm.$^2$ being not preferable in view of operation and equipment involved.

Air is most practically and advantageously employed as the molecular oxygen or the gas containing oxygen, but oxygen gas, air admixed with oxygen gas, and a mixture of oxygen with an inert gas such as $N_2$ and $CO_2$ can also be used. It is thought that the feeding of oxygen in an amount more than necessary for oxidation also serves to inhibit side-reactions by the increase of oxygen concentration, to oxidize the impurities (mainly coloring matters) formed as by-products in the oxidation reaction to make them into non-coloured substances or convert them into substances easily soluble in a solvent or to oxidize them to substances which will not be involved into the crystals of terephthalic acid when the crystals are precipitated. It is convenient to determine an amount of oxygen to be fed on the basis of the concentration of molecular oxygen present in the waste gas from the reaction zone. It is preferable to carry out the reaction by adjusting the amount of molecular oxygen to at least 3%, preferably 4-14%, based on the waste gas.

The continuous feeding of a stream of a mixture of para-xylene, acetic acid and catalyst into the complete mixing type reaction zone and the continuous withdrawal of a stream of the reaction product therefrom may be conducted in a smallest possible amount so that the residence time of the reactants within the said zone may be 20 to 180 minutes, preferably 40 to 90 minutes. The withdrawal may also be performed frequently and intermittently in a small amount at a time. It should be understood therefore that the "continuous withdrawal" used in this invention is a term which also means a frequent and intermittent withdrawal which can be regarded as being substantially continuous.

It has not yet been known why the amount of the impurities is decreased by the oxidation reaction under the specified conditions of this invention and what impurities to bar a fiber-grade purity are prevented from being formed as by-products. But the employment of the complete mixing type oxidation reaction of this invention which runs counter to the previously recommended oxidation method, in conjunction with the essential conditions in the step of crystallizing the reaction product and the process to crystallization, is of help in producing a fiber grade terephthalic acid constantly.

According to the method of this invention, operation is done so that the oxidation may be substantially completed by the reaction within the complete mixing type reaction zone, but if desired, in order to completely oxidize a substantially negligible amount of the unoxidized substance, the reaction of the unreacted substance which may remain in a small amount can, though not necessary, be completed by means of a plug flow or a mixing vessel subsequent to the reaction in the complete mixing type reaction zone. In the complete mixing type reaction zone according to the method of this invention, if the oxygen concentration in the waste gas exceeds 14.5% by volume, there is danger of explosion. However, it is possible to introduce molecular oxygen gas or molecular oxygen-containing gas in an amount such as to increase the oxygen concentration in the waste gas to more than 15% by blowing into the gaseous phase an inert gas in order to avoid explosion.

As the catalyst, polyvalent heavy metal catalyst and promotors such as a bromine-imparting substance, preferably known oxidizing catalysts such as acetate of cobalt and/or manganese and a bromine-imparting substance can be used. The proportion of the said catalyst and the said promotor is within the range of 10 to $\frac{1}{10}$ of the catalyst metal atom per one bromine atom. The amount of the catalyst used is within the range of 0.001 to 1% by weight, preferably 0.02 to 0.5%, based on the reaction liquor.

To the reaction product liquor which has gone through a step of oxidation reaction, acetic acid is added in an optional zone after the reaction zone and before a zone containing the crystal precipitating zone. The objects of this invention cannot be achieved even if a corresponding amount of acetic acid is added in advance to the reaction zone. It is commercially disadvantageous because in addition to the above, the amount to be treated in the reaction zone is increased in vain to the extreme. In addition, the conversion ratio is markedly lowered.

The acetic acid to be added at this time is subject to the following limitations besides the time of addition as above mentioned.

Namely, (i) the acetic acid to be added is of a temperature lower than that of the stream of the said reaction product; (ii) the acetic acid is added while the temperature of the stream of the reaction product is not lower than 180° C., and a precipitated solid terephthalic acid in the said liquor does not exceed 20% by weight of the said liquor, especially preferably at a temperature not lower by 20° C. than the temperature of the liquor leaving the reaction zone; (iii) the amount of acetic acid added should be within a range of $\frac{1}{10}$ to 5 times, preferably $\frac{1}{2}$ to 4 times, the volume of the said reaction product liquor.

The addition of acetic acid of a temperature higher than that of the stream of the reaction product adversely affects the preparation of a fiber grade high purity product. If the addition is made to the reaction product liquor of a temperature not higher than 180° C. and having a precipitated solid content in excess of 20% by weight, the fiber grade quality is markedly impaired presumably owing to the precipitation of impurities, particularly the precipitation tendency of impurities which adversely affect the fiber grade purity. If the crystals precipitated by the above-mentioned method are rinsed with acetic acid, it is no longer possible to obtain the product of the fiber grade quality constantly. Furthermore, if the amount of addition departs from the above-mentioned range, it is not possible at all to make a product having a fiber grade purity and an optical density not greater than 0.04, presumably because such is related to the precipitating tendency of the impurities which greatly affect the fiber grade purity.

The optical density in this invention is determined by means of a spectrophotometer at the wavelentgh of 380 m$\mu$ using a 10 mm. silica cell. The sample solution is prepared by dissolving 3 g. of the terephthalic acid into 20 ml. of 2 N potassium hydroxide aqueous solution and as reference solution the potassium hydroxide aqueous solution of the same concentration is used.

As the acetic acid to be added while after the reaction, the solid precipitated terephthalic acid content in the stream of the reaction product liquor does not exceed 20% by weight of the said liquor, there may be used as a substitute the reaction mother liquor after separation of the precipitated terephthalic acid after the precipitating step which has been made to satisfy the said conditions (i) and (iii) with or without addition of acetic acid for adjusting the amount of acetic acid in the mother liquor.

According to the method of this invention, such operation as will evaporate the acetic acid in a zone where a substantial crystal precipitation is effected should not be done. Such an operation is markedly detrimental to the maintenance of the fiber grade quality. In the method of this invention, therefore, the acetic acid to be added should be maintained at a pressure above its vapor pressure at the temperature of the precipitating zone (iv).

Thus, by practising the method of this invention within a range where the various conditions specified in the appended claims and a combination thereof can be secured, with appropriate modifications, if desired, or without such, it is possible to manufacture constantly a fiber grade terephthalic acid having an optical density of not greater than 0.04 and satisfying the need of the already mentioned fiber grade which is suitable for the manufacture of polyesters for fibers and films which require a high degree of transparency and/or whiteness.

Several embodiments of the practice of the method of this invention will be explained in the following by examples and controls.

EXAMPLE 1 AND CONTROLS 1 AND 2

With the use of a 200 liter titanium cylindrical reaction vessel with a diameter of 40 cm. equipped with an oxygen or oxygen-containing gas inlet at the bottom, a starting para-xylene and acetic acid solvent inlet at the lateral part, an opening for waste gas exhaustion at the upper part, and a stirrer within the vessel to give sufficient stirring, a stream of a mixture composed of a mixture of para-xylene and acetic acid in a proportion of 1:10 by weight and 0.05% of cobalt acetate, 0.1% of manganese acetate and 0.05% of ammonium bromide as catalyst based on the said reaction liquor was charged at a rate of 150 l./hr. into a complete mixing type reaction zone where a water-acetic acid vapor to be entrained in a waste gas is cooled and condensed by a condenser provided in a waste gas pipe communicating with the waste gas exhaustion opening and is refluxed through another pipe to the upper part of the reaction vessel. While maintaining the reaction pressure within the reaction zone at 33 kg./cm.$^2$ gage and the reaction temperature at 230° C., air was continuously introduced to adjust the oxygen in the waste gas exhausted from the said reaction zone to 6% by volume based on the said waste gas. While performing the charging of the said mixture stream and the introduction of air continuously under stirring, reaction was carried out with a residence time of 60 minutes. On the other hand, the reaction product liquor was continuously withdrawn to a receiver vessel in an amount and at a speed corresponding to the said residence time. The temperature of the reaction product liquor introduced into the receiver vessel was 220° C. The receiver vessel was continuously charged with acetic acid of room temperature at a rate of 150 l./hr. at a pressure of 32 kg./cm.$^2$ (gage). In the meantime, the contents were withdrawn continuously to maintain the liquid level of the said vessel at a constant. Operation was made so that the volume of the introduced reaction product liquor might be roughly equal to that of the introduced acetic acid.

The stream withdrawn from the receiver vessel was sent to an atmospheric pressure receiver vessel through a pressure control valve. The precipitated solid terephthalic acid in the reaction product liquor before being mixed with acetic acid was 10.2% by weight.

The substantial precipitation of terephthalic acid crystals began with the addition of acetic acid, and most of them had been precipitated until they were sent to the atmospheric pressure receiver vessel. The precipitated terephthalic acid crystals were then separated by a centrifugal separator, and washed with acetic acid to obtain white crystals. The yield of terephthalic acid crystals based on the starting para-xylene was 94% by weight. The appearance, purity (wt. percent), aldehyde content (wt. percent), Hazen number, and optical density of the obtained terephthalic acid are shown in Table 1 below. Polyethylene terephthalate produced from this terephthalic acid by direct polymerization method had a satisfactory whiteness.

The purity was determined by converting the terephthalic acid into its barium salt, and measuring its weight. The Hazen number is the indication by means of APHA indication method of the colour of a solution of 2.5 g. of a sample in 100 ml. of 1 N sodium hydroxide solution. The aldehyde content was determined by polarographical analysis of a solution of terephthalic acid dissolved in an ammonia buffer solution. The optical density was measured as already mentioned.

Ths Hazen number of polyethylene terephthalate was measured as follows. Seventy-five grams (1.2 moles) of ethylene glycol and 10 mg. of antimony oxide were added to 33 g. (0.2 mole) of terephthalic acid, and the mixture was esterified by heating at 196° C. for 4 hours. The reaction product was transferred to a polymerization vessel, and excess ethylene glycol was removed by distillation. The esterified product was then polycondensed for 1.5 hours at 270° C. and 0.5 mm. Hg while bubbling with nitrogen. The colour of molten polyethylene terephthalate was measured by comparison with the APHA standard. Terephthalic acid which gives polyethylene terephthalate Hazen number of not greater than 150 is of a satisfactory quality as a fiber grade terephthalic acid of high purity.

For the sake of comparison, Table 1 also shows an example (Control 1) wherein the procedures of Example 1 were repeated except that the oxidation was carried out by the batch method instead of the use of the continuous complete mixing type reaction zone and another example (Control 2) wherein the procedures of example were repeated except that the oxidation was carried out in two stages by the provision of two reaction zones.

TABLE 1

|  | Example 1 | Control 1 | Control 2 |
| --- | --- | --- | --- |
| Appearance | (1) | (2) | (1) |
| Purity (wt. percent) | 100 | 97.0 | 99.7 |
| Aldehyde content (wt. percent) | 0.03 | 2.0 | 0.054 |
| Hazen number | 8 | >500 | 40 |
| Optical density (380 m$\mu$) | 0.024 | 0.95 | 0.108 |
| Hazen number of polyethylene terephthalate | 50 | >1,000 | 350 |

[1] White crystals.
[2] Yellowish crystals.

EXAMPLE 2 AND CONTROLS 3, 4 AND 5

With the use of the same apparatus as used in Example 1, a mixture of para-xylene and acetic acid in a proportion of 1:6 by weight was fed into a reaction zone where complete mixing is possible, and the procedures of Example 1 were repeated except that the reaction temperature was adjusted to 240° C., and the temperature of the reaction product before addition of acetic acid of room temperature was maintained at 230° C. (Example 2).

For the sake of comparison, crystallization was effected by addition of acetic acid after lowering the temperature of the reaction product to be withdrawn from the reaction zone to 160° C. under the same conditions as in Example 2 (Control 3), the same procedures as in Example 2 were repeated except that acetic acid was added in an amount $\frac{1}{15}$ times the volume of the reaction product (Control 4), and the procedures of Example 2 were repeated except that the proportion of para-xylene to acetic acid was adjusted to 1:4 by weight (Control 5). The results are shown in Table 2.

TABLE 2

| | Ex. 2 | Control 3 | Control 4 | Control 5 |
|---|---|---|---|---|
| Temperature of reaction product before addition of acetic acid (° C.) | 230 | 160 | 230 | 230 |
| Concentration of precipitated terephthalic acid in reaction product (wt. percent/reaction liquor) | 16.9 | 19.2 | 16.9 | 23.7 |
| Amount of acetic acid added (acetic acid/reaction product volume ratio) | 1 | 1 | 1/15 | 1 |
| Formed terephthalic acid: | | | | |
| Appearance | (¹) | (¹) | (¹) | (¹) |
| Purity (wt. percent) | 99.96 | 99.95 | 99.95 | 99.88 |
| Aldehyde content (wt. percent) | 0.031 | 0.038 | 0.040 | 0.097 |
| Hazen number | 9 | 15 | 12 | 25 |
| Optical density | 0.028 | 0.052 | 0.046 | 0.125 |
| Hazen number of polyethylene terephthalate | 80 | 250 | 200 | 500 |

¹White crystals.

What is claimed is:

1. A method for manufacturing a fiber grade high purity terephthalic acid by oxidizing para-xylene by contact with molecular oxygen or molecular oxygen-containing gas in an acetic acid solvent under the high temperature and elevated pressure conditions in the presence of a catalyst soluble in the said solvent, such method comprising carrying out the oxidation reaction while continuously introducing into a reaction zone where complete mixing is possible, a stream of a mixture containing para-xylene, acetic acid and a catalyst and molecular oxygen or molecular oxygen-containing gas in an amount such that oxygen present in the waste gas exhausted from the said reaction zone may be 3% or more by volume of the said exhaust gas; substantially continuously withdrawing the reaction product liquor from the said reaction zone; and in a zone after the reaction zone and before the end of a crystal precipitating zone, adding additional acetic acid of a temperature lower than the temperature of the said reaction product in an amount 1/10–5 times, the volume of the said reaction product liquor said additional acetic acid being added while the temperature of the said reaction product liquor is not lower than 180° C. and while a solid terephthalic acid precipitated in the said reaction product liquor does not exceed 20% by weight based on the said reaction product liquor, so as to thereby substantially precipitate the terephthalic acid crystals, the acetic acid in the precipitating zone being maintained at a pressure above its vapor pressure at the temperature of the precipitating zone.

2. The method of claim 1 wherein the said oxidation reaction is carried out at a temperature of 200 to 250° C. and a pressure of 28 to 45 kg./cm.² (gage) with an average residence time of 20 to 180 minutes.

3. The method of claim 1 wherein the addition of the acetic acid is made while the temperature of the reaction product liquor is not more than 20° C. lower than the temperature at which it leaves the reaction zone.

4. The method of claim 1 wherein the oxygen in the waste gas is 4 to 14% by volume based on the said waste gas.

5. A method for manufacturing a fiber grade high purity terephthalic acid by oxidizing para-xylene by contact with molecular oxygen or molecular oxygen-containing gas in an acetic acid solvent under the high temperature and elevated pressure conditions in the presence of a catalyst soluble in the said solvent, said method comprising carrying out the oxidation while continuously introducing into a reaction zone where complete mixing is possible, a stream of a mixture containing para-xylene, acetic acid and a catalyst in which the para-xylene is 5 to 17% of the total amount of the para-xylene and acetic acid and molecular oxygen or molecular oxygen-containing gas in an amount such that the oxygen present in the waste gas exhausted from the said reaction zone may be 4 to 14% by volume based on the said waste gas; substantially continuously withdrawing the reaction product liquor from the said reaction one; and in a zone after the reaction zone and before the end of a crystal precipitating zone, adding acetic acid of a temperature lower than the temperature of the said reaction product liquor in an amount ½ to 4 times the volume of the said reaction product liquor, said additional acetic acid being added while the temperature of the said reaction product liquor is not more than 20° C., lower than the temperature at which it leaves the reaction zone, and it is not lower than 180° C., and while a solid terephthalic acid precipitated in the said liquor does not exceed 20% by weight based on the said liquor, so as to thereby substantially precipitate the terephthalic acid crystals, the acetic acid in the precipitating zone being maintained at a pressure above its vapor pressure at the temperature of the precipitating zone.

References Cited

UNITED STATES PATENTS 2,479,067   8/1949   Gresham _____ 260—524
3,170,768   2/1965   Baldwin _____ 260—524

LORRAINE A. WEINBERGER, Primary Examiner

R. S. WEISSBERG, Assistant Examiner